United States Patent [19]
Ichiyanage

[11] 3,783,357
[45] Jan. 1, 1974

[54] CONSTANT SPEED CONTROLLING DEVICE FOR A DIRECT CURRENT MOTOR

[75] Inventor: Toshikazu Ichiyanage, Tokyo, Japan

[73] Assignee: Canon Kabushiki Kaisha, Tokyo, Japan

[22] Filed: Nov. 10, 1971

[21] Appl. No.: 197,255

[30] Foreign Application Priority Data
Nov. 14, 1970 Japan.............................. 45-100611

[52] U.S. Cl.................. 318/138, 318/254, 318/685
[51] Int. Cl. ........................................... H02k 29/00
[58] Field of Search.................... 318/138, 171, 254, 318/227, 230, 231, 341, 685

[56] References Cited
UNITED STATES PATENTS

| | | |
|---|---|---|
| 3,518,516 | 6/1970 | Pawletko ........................... 318/415 |
| 3,374,410 | 3/1968 | Cronquist et al. .................. 318/415 |
| 3,581,173 | 5/1971 | Hood et al. ......................... 318/138 |
| 3,601,678 | 8/1971 | Abraham et al. ................... 318/254 |
| 3,636,429 | 1/1972 | Jakubowski et al. ............... 318/685 |

Primary Examiner—Gene Z. Rubinson
Attorney—Joseph M. Fitzpatrick et al.

[57] ABSTRACT

An improved DC motor is provided with an external reference (frequency signal) oscillator, means for detecting the angular position of a rotor of the motor including magnets, and control means which is adapted to flow the exciting current to the field or driving windings of the motor in synchronism with either the output signals from said reference oscillator and said detecting means, and to interrupt the exciting or driving current in response to the other signal, whereby the motor functions as a DC motor until its rotational speed reaches a predetermined speed to provide the starting torque, but functions as a synchronous motor which rotates in synchronism with the signals from said reference oscillator after the speed of the motor has reached said predetermined speed.

7 Claims, 9 Drawing Figures

CONSTANT SPEED CONTROLLING DEVICE FOR A DIRECT CURRENT MOTOR

BACKGROUND OF THE INVENTION

1. Field of the Invention

The present invention relates a direct current motor having both the starting characteristic of a DC motor and the constant speed characteristic of a synchronous motor.

2. Description of the Prior Art

In the prior art DC motors, a relatively high starting torque may be attained, but the rotational speed changes due to the change of load. On the other hand, in the prior art synchronous motors, the fixed synchronous speed characteristic is excellent, but no starting torque is provided so that it cannot be self-started. These problems of the DC and synchronous motors of the prior art have been overcome to some extent by the prior art induction motors, but their starting torque and fixed synchronous speed characteristic are not sufficient. Furthermore, the rotational speed is reduced by the slip. Therefore, there has been a strong demand for an electric motor having both a sufficient starting torque and a stable fixed synchronous speed characteristic.

For this purpose, the prior art has provided a method (1) in which the synchronizing signals are supplied from a synchronizing device disposed exteriorly of the DC motor so that the rotor may rotate at a speed in synchronism with the synchronizing signals after the speed of the rotor has reached a predetermined speed, and a method (2) in which the special starting device is provided for starting the synchronous motors. In both of the methods (1) and (2), the arrangements are in general complex; and automatic operation is almost impossible because some operations are necessary in starting the motors and then it is required to shift the DC motor to the synchronous motor.

SUMMARY OF THE INVENTION

One of the objects of the present invention is to provide an improved DC motor which overcomes the problems encountered in the prior art DC and synchronous motors and has the starting characteristic of a DC motor as well as a fixed synchronous speed characteristic of a synchronous motor.

A second object of the present invention is to provide an improved DC motor which comprises a reference oscillator and means for detecting the angular position of the rotor so that the current is supplied to the field or driving windings of the motor in synchronism with either of the signals from said reference oscillator or said detecting means, but is interrupted in response to the other signal.

A third object of the present invention is to provide an improved DC motor in which the rotor including magnets may be rotated by controlling the supply of the exciting current to the field windings of the stator by switching means utilizing transistors or other semiconductor elements without using the brushes, commutators and the like which are in general the essential parts of the prior art DC motors, whereby the mechanical abrasion and wear may be minimized to increase the service life of the motor.

A fourth object of the present invention is to provide an improved DC motor which comprises a control circuit capable of automatically providing a large starting torque of a DC motor when starting and a fixed synchronous speed characteristic of a synchronous motor when rotated at a constant speed.

A fifth object of the present invention is to provide an improved DC motor which comprises an exterior reference oscillator, a means for detecting the angular position of the rotor, and control circuits connected to both the reference oscillator and detecting means for controlling the motor, said control circuit further comprising a flip-flop circuit.

A sixth object of the present invention is to provide an improved DC motor which comprises an external reference oscillator, means for detecting the angular position of the rotor, and control means connected to both the reference oscillator and the detecting means, said control means comprising an up/down counter or reversible counter.

The above and other objects, features and advantages of the present invention will become more apparent from the following description of the preferred embodiments thereof taken in conjunction with the accompanying drawings.

DESCRIPTION OF THE PREFERRED EMBODIMENTS

Figure 1:
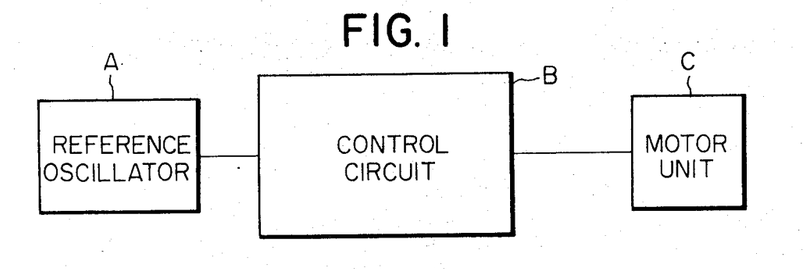
FIG. 1 is a block diagram for explanation of the underlying principle of the present invention, especially the relation between a reference oscillator and a control circuit coupled to a DC motor of the present invention.

First referring to FIG. 1, the underlying principle of the present invention will be described. The driving system of the present invention in general comprises a reference frequency oscillator A, a control circuit B for controlling the rotational speed of an electric motor, and a motor unit C which includes a stator, a rotor, means for detecting the angular position of the rotor and driving field coils mounted on the stator. The control circuit B is adapted to flow the current through the driving coils of the motor in response to either the input signals from the reference oscillator A or the angular position detecting means in the motor unit C, and interrupts the current to the driving coils in response to the other input signal.

Figure 2:
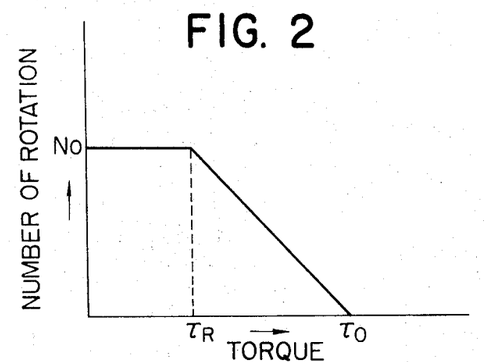
FIG. 2 is a graph of a torque-rotational speed characteristic curve of the DC motor in accordance with the present invention.

The torque-rotational speed characteristic curve of the DC motor to which the present invention is applied in the manner described above is shown in FIG. 2, in which the torque is plotted on the abscissa, whereas the number of rotation, on the ordinate. As the number of rotation of the DC motor increases from zero to a predetermined number No, the torque changes from the starting torque $\tau_o$ to $\tau_R$. During this period the DC motor functions as a DC motor. After the number of rotation has reached the predetermined number No, the rotational speed and thus the number of rotation is maintained substantially at the predetermined number No even when the torque is varied due to the change of the load. That is, the DC motor of the present invention functions as a synchronous motor during this period or range.

The first embodiment of the present invention capable of attaining such torque-rotational speed characteristic as above will be described hereinafter with reference to FIG. 3.

A reference oscillator 1 generates electrical pulse signals of a predetermined frequency, which are applied to a ring counter 2 which functions to transmit these pulse signals in a predetermined phase relation (in the instant embodiment, in three phases) to flip-flops 3, 4 and 5 of conventional construction. These flip-flops 3, 4 and 5 are controlled in response to the output pulse signals from the ring counter 2 and the output signals from a means for detecting the angular position of the rotor to be described in detail hereinafter. A rotor 6 of a permanent magnet is shown as having two poles, but it is understood that it may have as many poles as desired. Three field windings 7, 8 and 9 are also shown for simplicity, but any suitable number of field windings may be employed if required. Three means 10, 11 and 12 for detecting the angular position of the rotor 6 are provided, and may be of conventional detecting elements such as Hall-Effect elements, coils, optical detectors or the like. AND gates 13, 14 and 15 perform logic operations in response to the outputs from the flip-flops 3, 4 and 5 and to the outputs from the detecting means 10, 11 and 12, respectively. Capacitors 16, 17 and 18 and resistors 22, 23 and 24 constitute the differentiation circuits respectively, the outputs of which are rectified by diodes 19, 20 and 21 respectively before they are applied to the flip-flops 3, 4 and 5 respectively.

Figure 3:
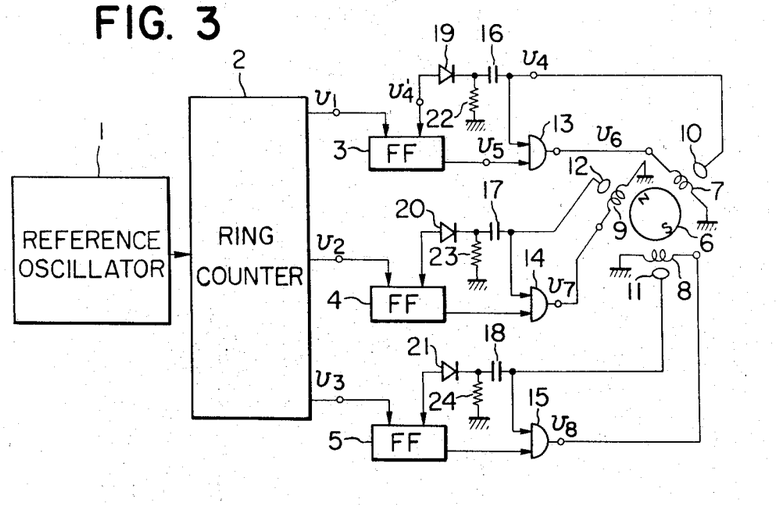
FIG. 3 is a circuit diagram of a first embodiment of a DC motor in accordance with the present invention.
Figure 4:
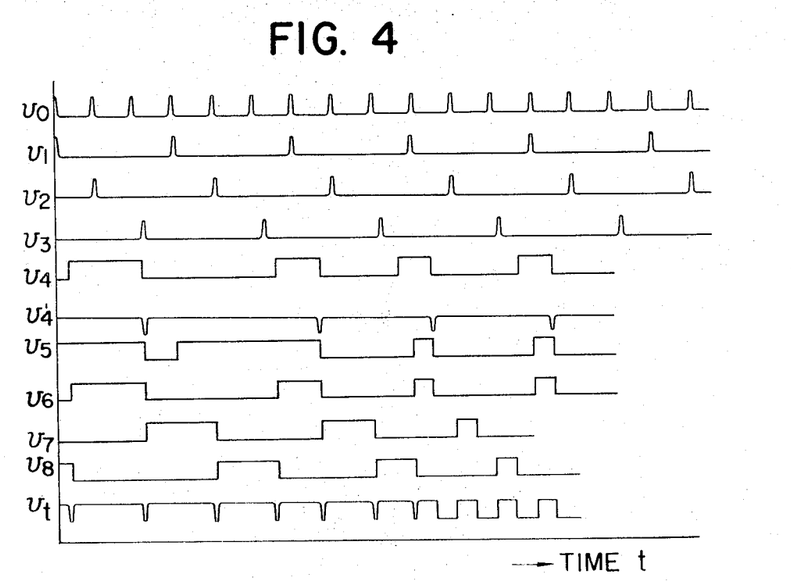
FIG. 4 is a diagram illustrating the waveforms of the signals at various points of the circuit shown in FIG. 3.
Figure 5:
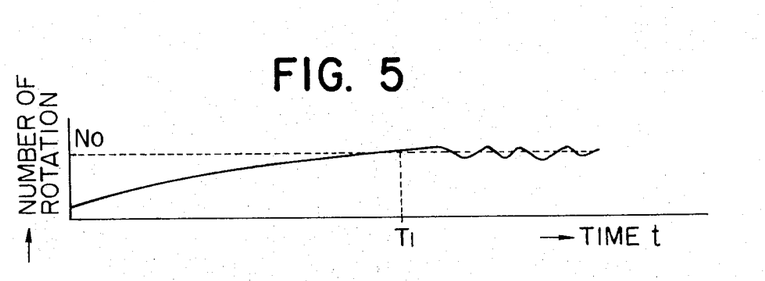
FIG. 5 is a graph illustrating a rotational speed characteristic curve of the DC motor shown in FIG. 3.

Next, the mode of operation of the first embodiment with the above-described arrangement will be described with reference to FIG. 4 in which the signal waveforms at various points in the circuit shown in FIG. 3 are shown. The pulse signal $v_o$ of a predetermined rate from the reference oscillator 1 is applied to the ring counter 2, which in turn transmits the signals $v_1$, $v_2$ and $v_3$, which are out of phase relative to one another as is clearly shown in FIG. 4, to the flip-flops 3, 4 and 5, respectively, to set them. These flip-flops 3, 4 and 5 are reset in response to the negative pulse signals which are the output signals from the detecting means 10, 11 and 12 differentiated by the differentiation circuits 19, 20 and 21, respectively. The waveform of the signal from the detecting means 10 is indicated at $v_4$, and the ON and OFF time intervals are reduced as the rotational speed of the rotor increases. The signal $v_4$ is differentiated by the RC differentiation circuit 22 and 16, and is rectified by the diode 19 into the negative pulse signal $v_4'$, which appears when the pulse signal $v_4$ rises. The negative pulse signal $v_4$ is applied to the flip-flop 3 to reset it so that the latter transmits the signal indicated by $v_5$ to the AND gate 13. When both the signal from the detecting means 10 and the output signal $v_5$ from the flip-flop 3 are simultaneously applied to the AND gate 13, it transmits a signal, indicated by $v_6$, to the field winding 7. In like manner, the output signals $v_7$ and $v_8$ are generated by the AND gates 14 and 15 and are applied to the field windings 9 and 8, respectively. Therefore, the sum of the exciting currents flowing through the field coils 7, 8 and 9 has the voltage waveform indicated by $v_t$. After the motor is started, the time interval during which the signal $v_t$ is maintained at a high level gradually becomes shorter as the number of rotation of the rotor 6 increases until the predetermined number No. is reached. The relationship between the number of rotations and the time is shown in FIG. 5. That is, the number of rotations of the motor reaches the predetermined number or synchronous speed No at $T_1$, and thereafter is maintained substantially at the same speed at $t \leq T_1$. More specifically at $t \geq T_1$, the current flow through the field windings 7, 8 and 9 is started in synchronism with the signal from the reference oscillator 1, and is interrupted in synchronism with the rotation of the rotor 6, that is at a time when the output signal from each of the detecting means 10, 11 and 12 rises as indicated by the waveform $v_t$ in FIG. 4. Thus, the number of rotations of the motor is maintained constant. The rotational speed curve at a time $t \leq T_1$ indicated in FIG. 5 is exaggerated to indicate clearly the change due to the conduction and interruption of the exciting current.

Figure 6:
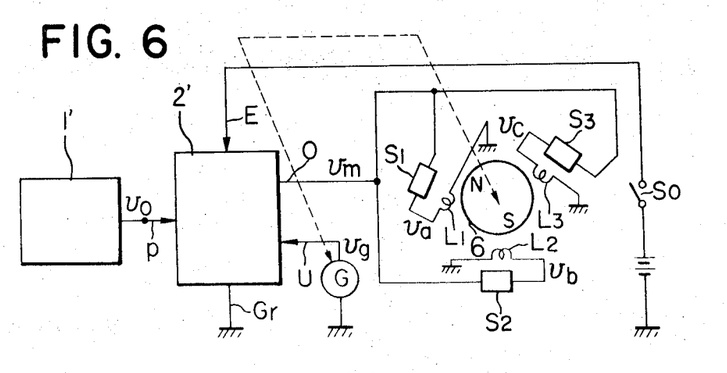
FIG. 6 is a circuit diagram of a second embodiment of a DC motor in accordance with the present invention.

Next, the second embodiment of the present invention will be described with reference to FIG. 6. Reference numeral 1' designates the reference oscillator of the type described above with reference to FIG. 3, and 2' designates an electric circuit which corresponds to a part of the control unit 2 shown in FIG. 3, and which has a power source terminal E, a grounding terminal Gr, an input terminal P for receiving the signal from the reference oscillator 1', another input terminal U for receiving the signal from a frequency generator G to be described hereinafter, and an output terminal 0. The level $v_m$ of the output from the output terminal 0 is so as to have one of the discrete voltage levels $v_{m1}$, $v_{m2}$, —, $v_{mn}$ (where n is an integer). Furthermore it is so arranged that when the signal pulse $v_o$ is applied to the input terminal P when the output voltage level is $v_{mk}$ (where $2 \leq k \geq n 6 1$, the level of the voltage at the output terminal 0 changes to $v_{m+1}$, whereas when the signal pulse Vg is applied to the input terminal U, the level of the voltage at the output terminal 0 changes from $v_{mk}$ to $v_{m(k-1)}$. Therefore, when the pulse $v_p$ is applied to the input terminal P and when the output voltage level at the output terminal 0 is $v_{m1}$, the output voltage level changes from $v_{m1}$ to $v_{m2}$, whereas when the pulse $v_g$ is applied to the other input terminal U, the circuit 2' is so designed that the output voltage level at the output terminal 0 remains $v_{m1}$. When the pulse $v_o$ is applied to the input terminal P and when the output voltage level is $v_{mn}$, the latter remains unchanged, whereas the pulse $v_g$ is applied to the other terminal U, the output voltage levels changes from $v_{mn}$ to $v_{m(n-1)}$. In response to the rotational speed of the motor, the frequency generator G generates the pulse signal $v_g$. The second embodiment shown in FIG. 6 further comprises a rotor 6 of a permanent magnet, field windings $L_1$, $L_2$ and $L_3$, and switching means $S_1$, $S_2$ and $S_3$ of conventional construction and which are connected to the field windings $L_1$, $L_2$ and $L_3$ in series respectively and are adapted to be closed through a predetermined angle of rotation of the rotor 6. For example, each switching means may have such an arrangement that the light from a light source such as a lamp may be interrupted to give a photoelectric effect element by a shield plate or the like attached to the rotor to interrupt the output from the photoelectric effect element. Alternatively, the magnetic field detecting element such as a Hall-Effect element may be used to distribute the current into the field windings. Reference numeral So designates a power source switch.

Next, referring to FIG. 7 the mode of operation of the second embodiment will be described with the assumption that the circuit 2' of the type described comprises the flip-flop of conventional construction so that the output voltage level at the output terminal 0 is either $v_{m1}$ or $v_{m2}$. When the switch So is closed, the circuit 2' is energized, so that when the output pulse $v_o$ from the reference oscillator 1' is applied to the input terminal P, the output voltage at the output terminal 0 of the circuit 2' changes from $v_m$ to the high voltage level $v_{m2}$, and is maintained at this level until the signal $v_g$ is applied, as will be described in detail hereinafter. If the switching means $S_1$ has been closed, the current flows through the field winding $L_1$ so that the rotor 6 starts rotation. The change of the voltage applied across the coil $L_1$ with time is shown at $v_a$ in FIG. 7. Next, when the direction of the rotation of the rotor 6 is counterclockwise, the switching means $S_2$ is closed to direct the flow of current into the coil $L_2$ to continue the rotation of the rotor 6. The change of the voltage applied across the coil $L_2$ with time is shown by $v_b$ in FIG. 7. Thereafter, the switching means $S_3$ is closed to direct the flow of current through the coil $L_3$ to continue the rotation of the rotor 6. The change of the voltage applied across the coil $L_3$ with time is shown at $v_c$ in FIG. 7.

In response to the rotational speed of the motor, the frequency generator G generates the pulse $v_g$, which is applied to the circuit 2' so that the output thereof changes from $v_m$ to $v_{m1}$ which is substantially equal to the zero level. As a consequence, the motor starts deceleration. When the rotational speed of the motor reaches the synchronous speed or predetermined number of rotation No at $T_1$ shown in FIG. 8, the frequencies of the output pulse signals from both the frequency generator G and the reference oscillator 1' become equal to each other as shown at $v_o$ and $v_g$ in FIG. 7, and the output level of the circuit 2' changes to the high level $v_{m2}$ in response to the input $v_o$. And in response to the input signal $v_g$, the output voltage changes to the low level $v_{m1} = 0$. When the rotational speed of the motor exceeds the synchronous speed No, the repetitive rate of the pulse $v_g$ becomes shorter so that the time interval at which the output voltage is maintained at the high level becomes accordingly shorter. As a result, the motor is decelerated. On the other hand, when the rotational speed of the motor is slower than the synchronous speed No, the repetitive rate of the pulses $v_g$ becomes longer so that the time interval at which the output voltage of the circuit 2' is maintained at $v_{m2}$ becomes accordingly longer. As a result, the motor is accelerated. Thus, the DC motor in accordance with the present invention may continue its rotation at the synchronous speed or predetermined number of rotations No.

Figure 9:
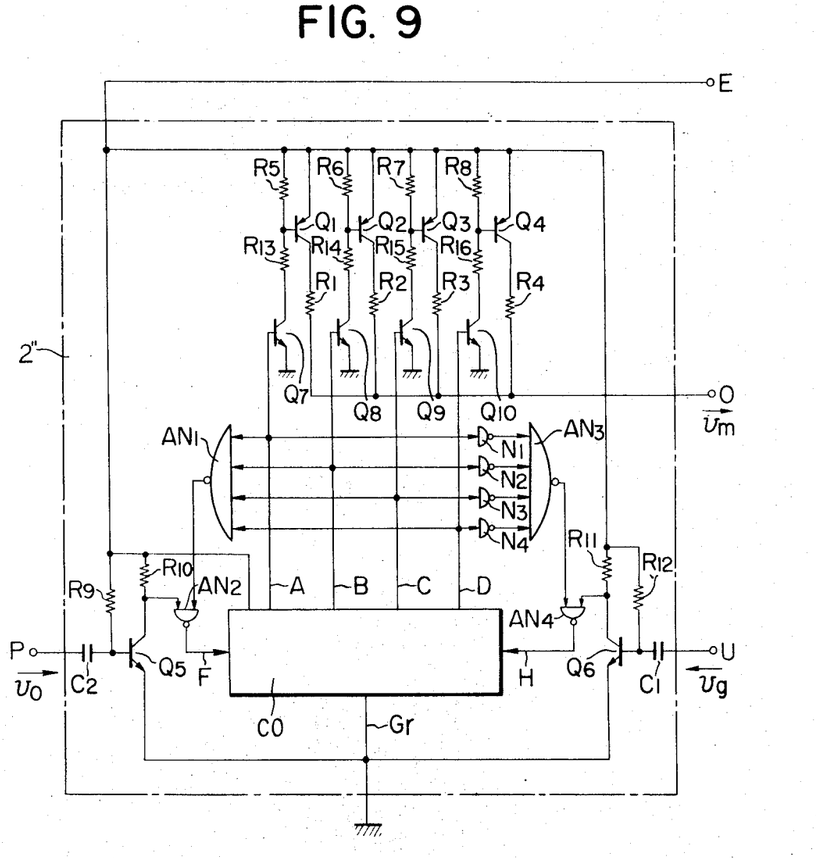
FIG. 9 is a circuit diagram of a third embodiment of the present invention, which is a modification of the second embodiment shown in FIG. 6.

Next, referring to FIG. 9, the third embodiment, which is a variation or modification of the second embodiment shown in FIG. 6 for improving the rotational speed characteristic, will be described. The arrangement shown in FIG. 9 is similar to that shown in FIG. 6 except for part 2", enclosed by the chain lines, which is relatively complex in construction. The five terminals P, U, O, E, and Gr are similar to those shown in FIG. 6, and the signals $v_o$, $v_g$ and $v_m$ appear on the terminals P, U and O respectively. The third embodiment comprises further a reversible or up/down decade counter CO having a pair of input terminals F and H, four output terminals A, B, C and D and a grounding terminal Gr, NAND circuits $AN_1$–$AN_4$, NOT circuits $N_1$–$N_4$, and transistors $Q_5$ and $Q_6$ having respective base resistors $R_9$ and $R_{12}$ and collector resistors $R_{10}$ and $R_{11}$ connected thereto.

First, the relationship between the inputs and outputs of the reversible counter CO will be described. When the input signal $v_o$ is applied to the input terminal P and when the output of the NAND circuit $AN_1$ is "1," the transistor $Q_5$ is turned off, due to a time constant of a time-constant circuit $C_2$ and $R_9$, so that the collector voltage becomes higher. As a consequence, the two "1" inputs are applied simultaneously to the NAND circuit $AN_2$ so that the "0" output thereof is applied to the input terminal F of the reversible counter CO. It should be noted that in this instance, the reversible counter CO operates in response to input pulse "0" and does not operate in response to input pulse "1." Accordingly, when the input "0" is applied to the counter CO, the outputs from the output terminals A, B, C, and D change from (1) (0000) to (2) (0001) assuming that ON corresponds to "1" and OFF to "0." When the next pulse $v_o$ is applied from the input terminal P, the outputs change from (2) (0001) to (3) (0010). In like manner, whenever the input pulse $v_o$ is applied, the outputs of the counter change from (3) (0010) to (4) (0011), (5) (0100), (6) (0101), — (14) (1101), (15) (1110), and (16) (1111). When the output of the counter CO becomes (16) (1111), all of the inputs applied to the input terminals of the NAND circuit $AN_1$ become "1" so that the output "0" is applied to the NAND circuit $AN_2$. Thereafter even when the input pulse $v_o$ is further applied from the input terminal P, "0" pulse will not be fed into the counter CO.

When the pulse $v_g$ is applied to the input terminal U from the frequency generator G, the transistor $Q_6$ is turned off due to a time constant determined by a time-constant circuit $C_1$ and $R_{12}$ so that its collector potential reaches a high level. As a consequence the input "1" is applied to the NAND circuit $AN_4$. In this case, since any of the inputs applied to the NAND circuit $AN_3$ through the NOT circuits $N_1$–$N_4$ are "0", the output of the NAND circuit $AN_3$ is "1." Therefore, the inputs "1" are simultaneously applied to both input terminals of the NAND circuit $AN_4$ so that its output changes from "1" to "0" which is applied to the input terminal H of the counter CO. Thus, the output thereof changes from (16) (1111) to (15) (1110). In like manner, in response to the input $v_g$ from the input terminal U, the output of the counter CO changes from (15) (1110) to (14) (1101), and finally to (1) (0000). When the output of the circuit CO becomes (1) (0000) in the manner described above, the outputs of the NOT circuits $N_1$–$N_4$ all become "1"s. In response to these inputs "1"s, the output of the NAND circuit $AN_3$ changes from "1" to "0" so that even when a further pulse $v_g$ is applied from the input terminal U, the output of the NAND circuit $AN_4$ remains 1 so that 1 pulse is not fed into the counter CO from its input terminal H. It is possible to replace the NOT circuits $N_1$ through $N_4$ and NAND circuit $AN_3$ with OR circuits.

Next, a logic circuit, which controls the output $v_m$ of the circuit 2'' in response to the output from the reversible counter CO, will be described. This logic circuit comprises transistors $Q_1$–$Q_{10}$ (except $Q_5$ and $Q_6$) which are connected to the output terminals A-D of the counter CO as shown in FIG. 9. Collector resistors $R_1$–$R_4$ of the transistors $Q_1$–$Q_4$ are connected to give the discrete output $v_m$ in response to the output such as (1) (0000) of the counter CO. Base resistors $R_5$–$R_8$ of the transistors $Q_1$–$Q_4$–Q connected to turn off the transistors $Q_1$–$Q_4$ when the output of the counter CO is (1) (0000). Collector resistors $R_{13}$–$R_{16}$ of the transistors $Q_7$–$Q_{10}$ are used to limit the base currents fed into the transistors $Q_1$–$Q_4$.

Next, the mode of operation of the logic circuit with the arrangement described above will be explained hereinafter. When the output at the output terminal A of the counter CO is "1," the transistor $Q_7$ is turned on so that its collector voltage reaches a low level, whereby the transistor $Q_1$ is also turned on. In like manner, when the output "1" appears on the output terminal B of the counter CO, both transistors $Q_8$ and $Q_2$ are turned on. In like manner, in response to the "1" outputs on the terminals C and D, the transistors $Q_9$ and $Q_3$; and $Q_{10}$ and $Q_4$ are turned on respectively.

When the outputs of the output terminals of the counter CO become all "1"s, that is when the output of the counter is (16) (1111), all of the transistors $Q_1$–$Q_4$ are turned on. As a consequence, the output $v_m$ at the output terminal 0 reaches its high level. When the output of the counter CO becomes (16) (1111), the pulse will not be fed into the counter CO from its input terminal F by the functions of the NAND circuits $AN_1$ and $AN_2$ in the manner described hereinbefore even when the pulse $v_o$ is applied to the input terminal P, the outputs at the output terminals A, B, C and D of the counter CO remain unchanged.

When the output $v_g$ from the frequency generator G is applied to the input terminal U, the counter CO functions in the manner described above to decrease the content from (16) (1111). As a result, the level of the output $v_m$ is reduced step by step.

In summary, depending upon whether the transistors $Q_1$–$Q_4$ are turned on or off, the output $v_m$ at the output terminal 0 has one of the sixteen discrete voltage levels (1) (0000), (2) (0001), (3) (0010), (4) (0011), (5) (0100), (6) (0101), (7) (0110), (8) (0111), (9) (1000), (10) (1001), (11) (1010), (12) (1011), (13) (1100), (14) (1101), (15) (1110) and (16) (1111) where "0" indicates that the transistor is turned off and "1", indicates that the transistor is turned on.

In the instant embodiment, the counter CO has been described as having four output terminals A, B, C, and D, But it is understood that the number of output terminals may be increased as needs demand, and the logic circuit may be modified accordingly.

Figure 7:
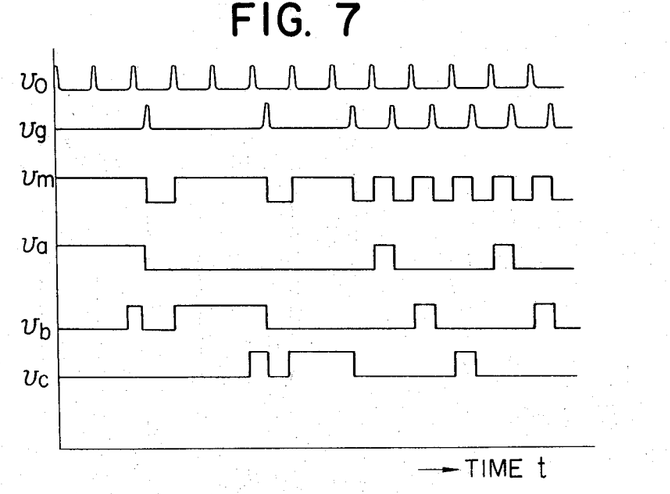
FIG. 7 is a diagram illustrating the waveforms of the signals at various points in the circuit shown in FIG. 6.
Figure 8:
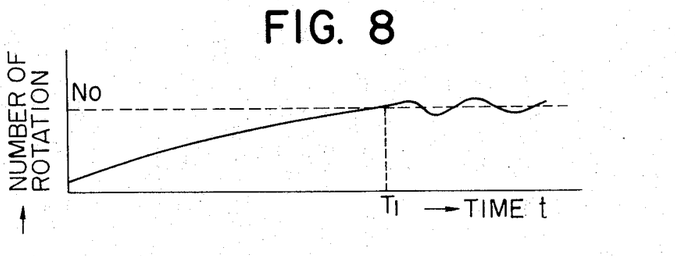
FIG. 8 is a graph illustrating a rotational speed characteristic curve of the DC motor shown in FIG. 6.

As described above, the output $v_m$ of the control circuit 2'' may be changed in step in such a manner that the change may become smoother than the waveform $v_m$ in FIG. 7. Therefore, it is possible to freely change the output $v_m$ by comparing the frequency from the reference oscillator with that of the frequency generator which is in proportion to the rotational speed of the motor after the rotational speed of the motor has reached the synchronous speed No and reducing the difference in said frequencies to zero, that is by making said two frequencies equal to each other. More specifically, when the rotational speed of the motor is in excess of the synchronous speed, the signal $v_g$ is applied to the control circuit 2'' including the counter CO of the type described at a frequency higher than that of the signal $v_o$ so that the value of the output $v_m$ is reduced accordingly. As a consequence the exciting currents applied to the field windings of the motor are reduced, thereby reducing the rotational speed of the rotor. On the other hand, when the rotational speed of the motor is lower than the synchronous speed, the signal $v_o$ is applied to the control circuit 2'' at a frequency higher than that of the signal $v_g$. Therefore the output $v_m$ of the control circuit may be immediately increased to increase the rotational speed of the rotor. The control circuit described hereinabove with reference to FIG. 9 is very advantageous in keeping the rotational speed of the motor in synchronism with the synchronizing signals generated by the reference oscillator with a higher degree of response. Thus, the stability in the rotational speed of the motor as well as the rising characteristic of the rotational speed vs. time curve of the motor is enhanced.

In summary, according to the present invention, the current flow through the field windings may be controlled in response to the output signal from the reference oscillator disposed outside of the motor and to the signals representative of the angle of rotation of the rotor, so that the driving currents are brought into synchronization with both signals at a predetermined constant speed. Therefore the problem of racing or hunting frequently encountered in the prior art synchronous motors may be overcome, and the rotational speed of the DC motor will not change in response to a change in load.

I claim:

1. A system for controlling the speed of a DC motor having a rotor, a field coil mounted on a stator, said rotor being rotated by exciting currents intermittently supplied to said field coil, said system comprising a reference oscillator for generating a reference signal of a constant frequency, detector means for detecting the rotational frequency of the rotor, said detector means being arranged adjacent said rotor for detecting the position of rotation of the rotor being rotated and generating a corresponding output signal, speed control means for said motor comprising counter means for producing an output signal responsive to said reference signals from said oscillator and to said output signals from said detector means, means for applying exciting current to said field coil of said DC motor to bring said motor up to a predetermined speed and to maintain said motor at said predetermined speed responsive to the output signals from said counter means and to the output signals from said detector means, said counter means in said control means comprising a flip-flop circuit which is set in response to said signal from said reference oscillator, and is reset in response to said signal from said detector means.

2. A system for controlling the speed of a DC motor having a rotor, a field coil mounted on a stator, said rotor being rotated by exciting currents intermittently supplied to said field coil, said system comprising a reference oscillator for generating a reference signal of a constant frequency, detector means for detecting the rotational frequency of the rotor, said detector means being arranged adjacent said rotor for detecting the position of rotation of the rotor being rotated and generating a corresponding output signal, speed control means for said motor comprising counter means for producing an output signal responsive to said reference signals from said oscillator and to said output signals from said detector means, means for applying exciting current to said field coil of said DC motor to bring said motor up to a predetermined speed and to maintain said motor at said predetermined speed responsive to the output signals from said counter means and to the output signals from said detector means, said control means comprising a ring counter for distributing said signals from said reference oscillator into a plurality of signal groups which are out of phase from one another, a flip-flop circuit interconnected between said ring counter and said rotational frequency detecting means, a logic circuit which functions in response to the inputs from said flip-flop circuit and said rotational frequency detecting means to apply its output to said field windings mounted on said stator.

3. A system for controlling the speed of a DC motor having a rotor, a field coil mounted on a stator, said rotor being rotated by exciting currents intermittently supplied to said field coil, said system comprising a reference oscillator for generating a reference signal of a constant frequency, detector means for detecting the rotational frequency of the rotor, said detector means being arranged adjacent said rotor for detecting the position of rotation of the rotor being rotated and generating a corresponding output signal, speed control means for said motor comprising counter means for producing an output signal responsive to said reference signals from said oscillator and to said output signals from said detector means, means for applying exciting current to said field coil of said DC motor to bring said motor up to a predetermined speed and to maintain said motor at said predetermined speed responsive to the output signals from said counter means and to the output signals from said detector means, said counter means in said control means comprising a reversible counter whose content is increased in response to the input signals from said reference oscillator and whose content is decreased in response to the input signals from said detector means.

4. A system for controlling the speed of a DC motor having a rotor, a field coil mounted on a stator, said rotor being rotated by exciting currents intermittently supplied to said field coil, said system comprising a reference oscillator for generating a reference signal of a constant frequency, detector means for detecting the rotational frequency of the rotor, said detector means being arranged adjacent said rotor for detecting the position of rotation of the rotor being rotated and generating a corresponding output signal, speed control means for said motor comprising counter means for producing an output signal responsive to said reference signals from said oscillator and to said output signals from said detector means, means for applying exciting current to said field coil of said DC motor to bring said motor up to a predetermined speed and to maintain said motor at said predetermined speed responsive to the output signals from said counter means and to the output signals from said detector means, said control means comprising a reversible counter adapted to carry out a predetermined number of additions and subtractions, and a plurality of logic circuits adapted to function in response to the output of said counter to feedback its output to the input terminal of said counter to carry out a predetermined number of additions and substractions.

5. A system according to claim 4 wherein said reversible counter and said plurality of logic circuits include a first logic circuit which functions in response to the signal representative of the maximum output of said counter to output "0" output, and a second logic circuit which functions in response to the signals from said reference oscillator and said first logic circuit to apply its output to said counter, whereby the maximum value of the output of said counter may be determined.

6. A system according to claim 4 wherein said reversible counter and said plurality of logic circuits comprises a first logic circuit which functions in response to the signal representative of the minimum output of said counter to output "0" output, a second logic circuit which functions in response to the output from said first logic circuit and to the signal representative of the rotational speed of said motor to apply its output to said counter, whereby the minimum value of the output of said counter may be determined.

7. A system for controlling the speed of a DC motor having a rotor, a field coil mounted on a stator, said rotor being rotated by exciting currents intermittently supplied to said field coil, said system comprising a reference oscillator for generating a reference signal of a constant frequency, detector means for detecting the rotational frequency of the rotor, said detector means being arranged adjacent said rotor for detecting the position of rotation of the rotor being rotated and generating a corresponding output signal, speed control means for said motor comprising counter means for producing an output signal responsive to said reference signals from said oscillator and to said output signals from said detector means, means for applying exciting current to said field coil of said DC motor to bring said motor up to a predetermined speed and to maintain said motor to said predetermined speed responsive to the output signals from said counter means and to the output signals from said detector means, said field coil including a plurality of field windings and said control means comprising means for distributing the motor driving current into said plurality of field windings,
said driving current distribution means comprising a logic circuit which functions in response to the outputs
from said counter means and said detector means to intermittently supply driving currents which are out of phase from one another to said plurality of field windings.

* * * * *